March 30, 1965     D. K. VATER     3,175,573
PACKING-ADJUSTING MEANS FOR CAPPED VALVE
Filed June 4, 1962     2 Sheets-Sheet 1

INVENTOR.
Donald K. Vater
BY
ATT'YS.

March 30, 1965   D. K. VATER   3,175,573
PACKING-ADJUSTING MEANS FOR CAPPED VALVE
Filed June 4, 1962   2 Sheets-Sheet 2
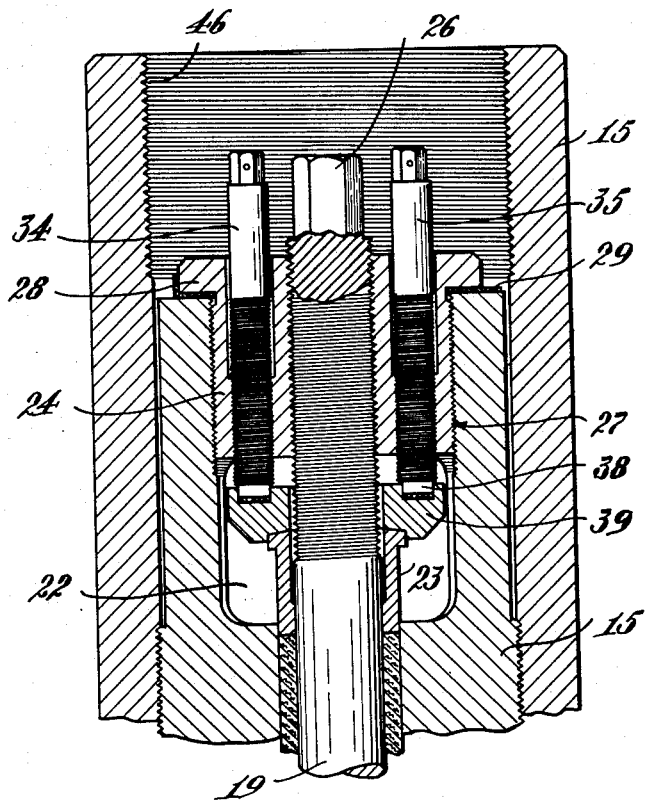
FIG. 2
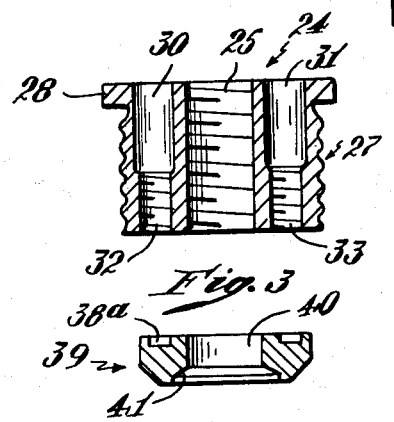
Fig. 3
Fig. 4
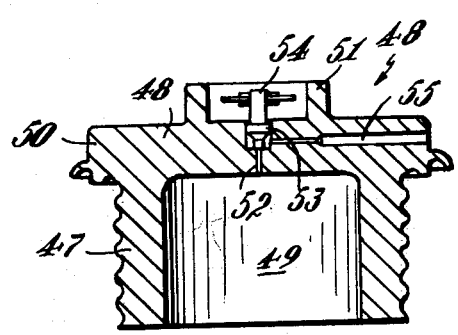
Fig. 5

United States Patent Office 3,175,573
Patented Mar. 30, 1965

3,175,573
PACKING-ADJUSTING MEANS FOR CAPPED VALVE
Donald K. Vater, South Natick, Mass., assignor to Manning, Maxwell & Moore, Incorporated, Stratford, Conn., a corporation of New Jersey
Filed June 4, 1962, Ser. No. 199,984
2 Claims. (Cl. 137—312)

This invention pertains to fluid-control valves of that general type wherein a valve disc is moved toward or from its seat by a screw-threaded stem and wherein, for reducing leakage along the stem, compressible packing and an adjustable packing gland are employed and relates more especially to a valve of the above type which is designed for the control of fluid at very high pressures and, in particular, fluid of a character such that its leakage into the region surrounding the valve would be dangerous to personnel, for example when the fluid is of poisonous nature.

Customarily, the means for adjusting a packing gland, in a valve of the above general type, has involved the employment of an elongate yoke extending transversely of the valve stem and having bolt openings at its opposite ends for the reception of bolts, usually parallel to the valve stem, arranged at diametrically opposite sides of the latter. Such an arrangement is so wide that if it be attempted to encase the valve stem and the packing gland, the resultant valve structure requires an amount of space not always readily available. Thus, hereto, the attempt to control leakage into the vicinity of the valve by the employment of an exterior housing has not met with real success, not only because of size limitations, but because of the inaccessibility of the means for adjusting the packing gland and for actuating the valve itself.

The present invention has for its principal object the provision of a valve, of the above general type, having means effective for preventing leakage of the controlled fluid into the surroundings of the valve but so designed that the means whereby the packing is adjusted occupies a minimum of space transversely of the valve stem and wherein, although the actuating or upper end of the valve stem is also enclosed in a casing or housing, nevertheless, the actuating end of the valve stem is readily accessible without in any way disturbing the setting of the packing gland. A further object is to provide a valve of the above general type, wherein the arrangement for adjusting the packing gland, although normally housed within a leak-tight casing, may be readily exposed for actuation by the removal of a single part and without interfering or modifying the setting of the valve.

Other and further objects and advantages of the invention will be pointed out in the following more detailed description and by reference to the accompanying drawings wherein:

FIG. 2 is a fragmentary section, in the same plane as FIG. 1, but showing the upper end of the valve stem and the packing-adjusting means exposed in readiness for actuation;

FIG. 3 is a section, showing the internally screw-threaded sleeve with which the threaded valve stem and the threaded packing-adjusting studs are associated;

FIG. 4 is a diametrical section illustrating the annular yoke to which pressure is applied for adjusting the packing gland; and FIG. 5 is a diametrical section illustrating the removable cap or cover forming a part of the casing which houses the upper end of the valve stem and the packing-adjusting studs.

Figure 1:
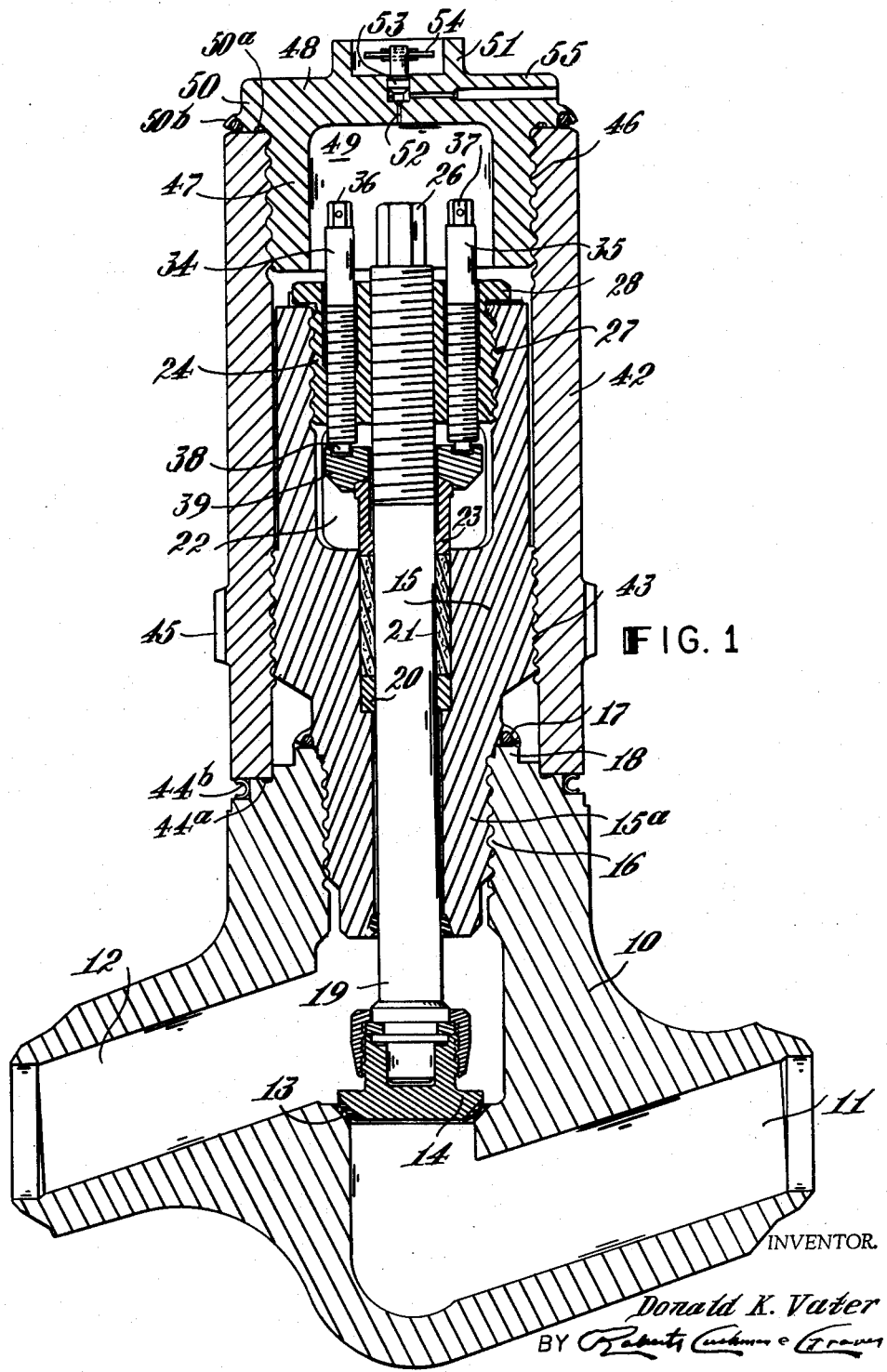
FIG. 1 is a somewhat diagrammatic, diametrical section through a valve embodying the present invention, showing the valve disc seated and the housing for the packing devices and the upper end of the valve stem in operative position.

Referring to the drawings, the numeral 10 designates the body of the valve, here shown as a unitary casting or forging, having passages 11 and 12, the first of which is the inlet passage and the other the discharge passage, and which, when the valve is open, communicate with each other through an opening provided in the seat annulus 13. This seat annulus is shown as having a beveled seat surface and may be of some wear-resistance material, such as is commonly used in valves of this general type, and which is brazed or otherwise fixed to the metal of the valve body 10. With this seat there cooperates the valve disc or feather 14, here shown as of simple unitary construction, having a short tubular boss for connection with the valve stem.

The valve also comprises the bonnet portion 15 which may, as indicated in the drawings, be a unitary piece of metal machined, for example, from bar stock and having the lower externally screw-threaded portion 15a for engagement with screw threads 16, formed in a bore, in the upper part of the body 10, coaxial with the valve seat. As here shown, the bonnet has an integral annular lip 17 whose lower edge may be welded to an upstanding annular rib 18 at the upper part of the body 10 to provide a permanent seal at this point when the bonnet is assembled with the body.

The bonnet 15 is provided with a cylindrical bore coaxial with the valve seat for guiding the valve stem 19, the lower end of which is connected to the valve disc 14 in conventional manner, for example, so that the valve disc 14 is permitted to rock with reference to the stem 19 so as to accommodate itself to the valve seat. As here shown, the bore in the bonnet 15, for guiding the valve stem is, at its upper portion, enlarged in diameter to provide a box for the reception of compressible packing. A rigid ring 20 seats on the bottom of this box. Above this ring 20 the box is filled with compressible packing material 21, such as is customarily employed in valves, for the purpose of preventing leakage along the stem, and above the packing there is a tubular gland 23 whose lower edge rests upon the packing and by means of which pressure may be exerted upon the packing. The upper part of the gland 23 is located in a cylindrical chamber 22 in the upper part of the bonnet. Within the upper part of the bonnet 15, which is internally screw-threaded, there is arranged a sleeve or plug 24 (FIG. 3) having an axial bore 25 which is screw-threaded for the reception of screw threads upon the upper part of the valve stem 19. The upper end of the valve stem, as shown at 26 in FIGS. 1 and 2, is polygonal for the reception of a socket wrench, by means of which the stem may be turned thereby to move the disc toward or from the seat.

The sleeve or plug 24 is externally screw-threaded, as indicated at 27 (FIG. 3), for engagement with the internally screw-threaded upper end portion of the bonnet 15, the sleeve or plug 24 having a radial flange 28 at its upper end whose edge is desirably polygonal for the application of a suitable wrench and which, when the parts are assembled, provides a limiting stop to prevent excessive downward movement of the sleeve or plug relatively to the bonnet. Desirably, as shown in FIG. 2, a metal locking plate 29 is disposed between the lower surface of the radial flange 28 of the sleeve or plug and the upper flat annular edge surface of the bonnet 15.

The sleeve or plug 24 is provided with bores 30 and 31 parallel to the screw-threaded bore 25 which receives the valve stem, these bores 30 and 31 being at diametrically opposite sides of the bore 25 and being of somewhat reduced diameter at their lower portions as compared with their upper portions, the lower portions being screw-threaded as shown at 32 and 33 (FIG. 3). These bores 30 and 31 are designed to receive screw-threaded studs 34 and 35 (FIGS. 1 and 2), having polygonal upper ends 36 and 37 for the application of a wrench, whereby the studs may be turned. Preferably the lower end of each stud is provided with a downwardly directed, unthreaded tip 38 which is received in an annular channel 38a in a yoke ring 39 having an axial bore 40 through which the upper threaded portion of the valve stem passes loosely. This yoke ring 39 has an annular conical surface 41 at its lower part which contacts a beveled upper face at the upper end of the gland 23. Thus, by the adjustment of the studs 34 and 35, the gland 23 may be forced down thereby compressing the packing 21 to reduce leakage of fluid along the valve stem.

At the extremely high pressures to which valves of this type are sometimes subjected and particularly where the pressure fluid may be subject to a very wide temperature variation, it is substantially impossible completely to prevent leakage along the valve stem. In accordance with the present invention and in order to prevent leaking fluid from escaping into the ambient atmosphere, there is provided a housing comprising a hollow cylindrical casing 42 having internal screw threads (FIG. 1) at its lower portion, here shown as engaging an externally screw-threaded part of the bonnet 15. However, it is within the scope of the invention to attach the casing 42, for example by screw threads, directly to the upper part of the valve body itself instead of to the bonnet.

Desirably, the upper end of the valve body 10 is provided with a flat annular surface for engagement with the flat annular lower edge of the casing member 42, but with the opposed parts so shaped as to provide an annular groove for the reception of a metal O-ring or gasket 44a which will usually provide a sufficient seal at this point. However, an external peripheral channel is also provided for the reception, if desired, of a metal C-ring 44b for use in making a permanent weld-seal at this point. This casing member 42 is here shown as having external ribs 45 for the reception of a wrench whereby the casing may be screwed down onto the bonnet 15.

The upper end portion of the casing 42 is internally screw-threaded, as indicated at 46, for engagement with the externally screw-threaded hollow stem portion 47 of a removable cap 48 (FIGS. 1 and 5). This cap has an interior chamber 49 of a size to accommodate the upper end of the valve stem and also the upper ends of the studs 34 and 35. This cap has a radial flange portion 50 which overlies the upper, flat annular edge of the casing 42 when the parts are assembled. Between the opposed faces of the parts 42 and 50 there is an annular groove for the reception of a metal O-ring or gasket 50a which is ordinarily sufficient to provide a leak-tight seal at this point. However, there is also provided an annular lip 50b integral with the part 50 and whose lower edge may be welded to the part 42 to provide a weld-seal if desired. Obviously, if such a seal be employed, it will be necessary to destroy this seal preparatory to removing the cap. As here shown, the cap 48 is provided with an upstanding hollow crown 51 which is desirably provided with flats on its outer periphery for the application of a wrench whereby the cap may be turned in assembling it with or removing it from the casing 42.

As here shown, the cap is provided with a passage 52 which is controlled by a valve 53 having an actuating handle 54. When this valve is unseated, the passage 52 communicates with an outlet passage 55, thus providing communication between the chamber 49 in the cap and the atmosphere.

With this arrangement the actuating upper end 26 of the valve stem and the polygonal actuating ends 36 and 37 of the studs 34 and 35, are normally enclosed airtight within the housing comprising the casing 42 and the cap 49, so that any slight leakage of pressure fluid along the valve stem is prevented from escaping into the ambient atmosphere. If at any time it be desired to actuate the valve stem for adjusting the effective size of the orifice through the valve seat, the cap 48 may be unscrewed, after breaking the weld-seal, if any, at 50b (leaving the casing 42 in place and without disturbing the sealing means between the casing 42 and the valve body 10), thereby exposing the upper end of the valve stem for actuation. In the same way, if it be desired to adjust the packing 21, removal of the cap 48 exposes the upper ends of the studs 34 and 35 so that these studs may be turned and the packing adjusted without disturbing the position of the disc 14.

Normally, the valve 53 will be closed so that no fluid can escape from the chamber 49. However, in preparation for removal of the cap 48, the passage 55 may be connected, for example, to a suction nozzle and the valve 53 opened, so as to clear out any pressure fluid which may have accumulated in the chamber 49 before the cap 48 is removed, thus, preventing the escape of any of the poisonous or irritating fluid into the near surroundings.

It will be noted that, by the arrangement herein disclosed, it is made possible to provide a valve body whose transverse dimensions do not exceed those of a conventional valve designed for the same pressure range, but wherein the actuating portion of the valve stem and the packing-adjusting studs are all housed within a casing whose external diameter does not exceed that of the upper portion of the valve body 10 itself. As clearly illustrated in the drawings, and particularly FIGS. 1 and 2, the aforementioned advantage is achieved, at least in part, by the significantly close spacing of the studs 34 and 35 relative to the stem 19. More specifically, and as clearly shown in the aforementioned drawings, the studs are spaced from the stem a distance substantially less than the diameter of the stem. While this relative dimensioning might vary with the diameter of the stem, it is, in the light of the preferred embodiment shown, indicative and significant of the overall arrangement of the parts of the valve of this invention which provides the desired objective of minimum transverse dimensions for that portion of the valve containing the packing adjusting studs, and distinguishes the valve of this invention over prior art valves. It may also be noted that the structure provided is very simple, employing parts which are easily manufactured; wherein a single part, that is to say, the sleeve 24, provides the screw-threaded openings for the valve stem and also for the two packing-adjusting studs; and that this sleeve fits within the upper portion of the valve bonnet itself which is circular at every cross-section; and of a design which makes it very rigid so that it is capable of withstanding the upward pressure which may be exerted upon the valve disc even though that pressure may be extremely high.

While one desirable embodiment of the invention has herein been disclosed by way of example, it is to be understood that the invention is broadly inclusive of any and all modifications such as may be considered the equivalents of those defined in the appended claims.

I claim:

1. A valve of the class described comprising a body having a substantially cylindrical upper portion, a bonnet of a maximum external diameter less than that of the upper part of the valve body, the valve bonnet having an axial bore, a valve stem slidably received in said bore and extending outwardly beyond both ends of said bore, a valve disc attached to the lower end of said valve stem, a valve seat on said body cooperable with said disc, said bore being enlarged at its upper end portion, packing received in the enlarged portion of the bore, a gland for applying pressure to said packing disposed about said valve stem, said bonnet having a chamber at its upper end into which said enlarged portion of the bore opens and said valve stem extends, the upper end of said gland being disposed in said chamber, a yoke ring resting on said upper end of the gland, a plug threadably engaged with said bonnet within said chamber and having a threaded central bore in which said valve stem is threadably engaged, said plug having additional threaded bores at diametrically opposite sides of said central bore, packing adjusting studs threadably engaged in said additional bores, said studs being spaced from said valve stem a distance substantially less than the valve stem diameter, the lower end of each stud engaging said yoke ring to exert a pressure thereon, a cylindrical casing coaxial with said bonnet and fixed relative to the valve body, said casing having an external diameter substantially equal to that of the cylindrical upper portion of said valve body, and a removeable cap normally closing the upper end of said cylindrical casing, said cap at least in part defining a chamber wherein the upper ends of said packing adjusting studs are housed.

2. A fluid-control valve of the class described comprising a valve body having a valve seat and inlet and discharge passages, a rigid valve bonnet fixed relatively to the valve body and having a stem-guiding bore coaxial with the seat, a valve head cooperable with the seat to control fluid flow, a valve-actuating stem slidable in the bore in the bonnet, means connecting the valve head to the lower end of the stem, the bore in the bonnet having an enlargement coaxial with the stem for the reception of packing material, a gland coaxial with the stem for applying pressure to packing within said enlargement of the bore, the bonnet having a cylindrical chamber in its upper end above said packing and coaxial with the valve seat, at least a portion of the inner surface of said chamber above said packing being screw-threaded, a plug having threaded engagement with the screw-threaded wall of said chamber, said plug having a central screw-threaded bore for operative engagement with a threaded portion of the stem, two other screw-threaded bores parallel to the central bore and at diametrically opposite sides respective of said central bore, a screw-threaded packing-adjusting stud in each of said other bores, the upper end of the valve stem and the upper ends of the packing-adjusting studs being shaped for the reception of actuating tools and being exposed above the upper end of the plug, means for transmitting downward axial motion of the studs to the packing gland, and means providing a fluid-tight housing for the upper ends of the packing studs and the upper end of the valve stem, said last mentioned means comprising a cylindrical casing fixed relative to the valve body in fluid-tight relation and having an external diameter not substantially exceeding that of the upper part of the valve body, and a removable cap for the upper end of said casing which normally closes the upper end of said casing and which at least in part defines a chamber within which the upper ends of the valve stem and studs are located, whereby upon removal of said cap said upper end of the valve stem and studs are readily accessible for adjustment.

References Cited by the Examiner

UNITED STATES PATENTS

| | | | |
|---|---|---|---|
| 432,744 | 7/90 | Adams | 251—318 |
| 1,035,467 | 8/12 | Radunz et al. | 137—583 XR |
| 1,995,395 | 3/35 | Mohr | 251—214 XR |
| 3,073,566 | 1/63 | Bredtschneider | 251—362 |

FOREIGN PATENTS

| | | |
|---|---|---|
| 662,711 | 11/38 | Germany. |
| 149,803 | 8/20 | Great Britain. |
| 616,091 | 1/49 | Great Britain. |

ISADOR WEIL, *Primary Examiner.*